Jan. 13, 1953  W. L. GRIFFIN  2,625,358
SUNSHADE FOR MOTOR VEHICLES
Filed Jan. 30, 1951
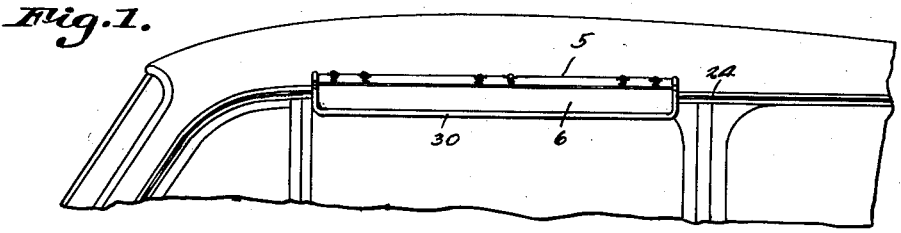
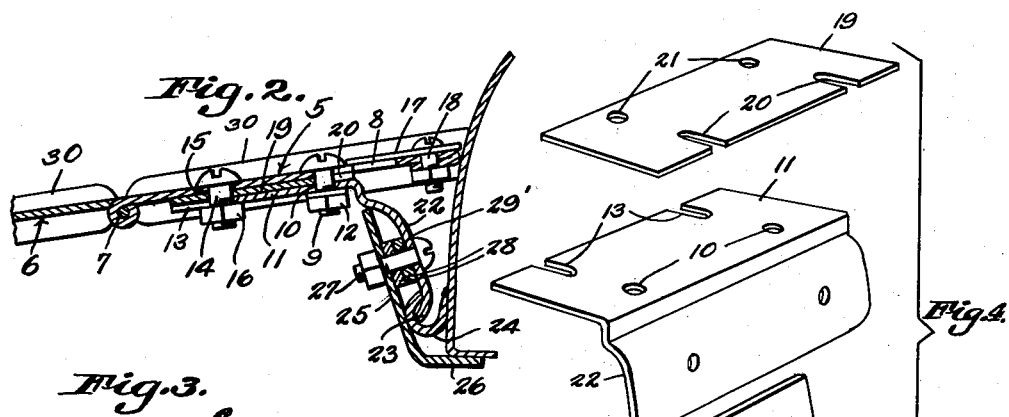
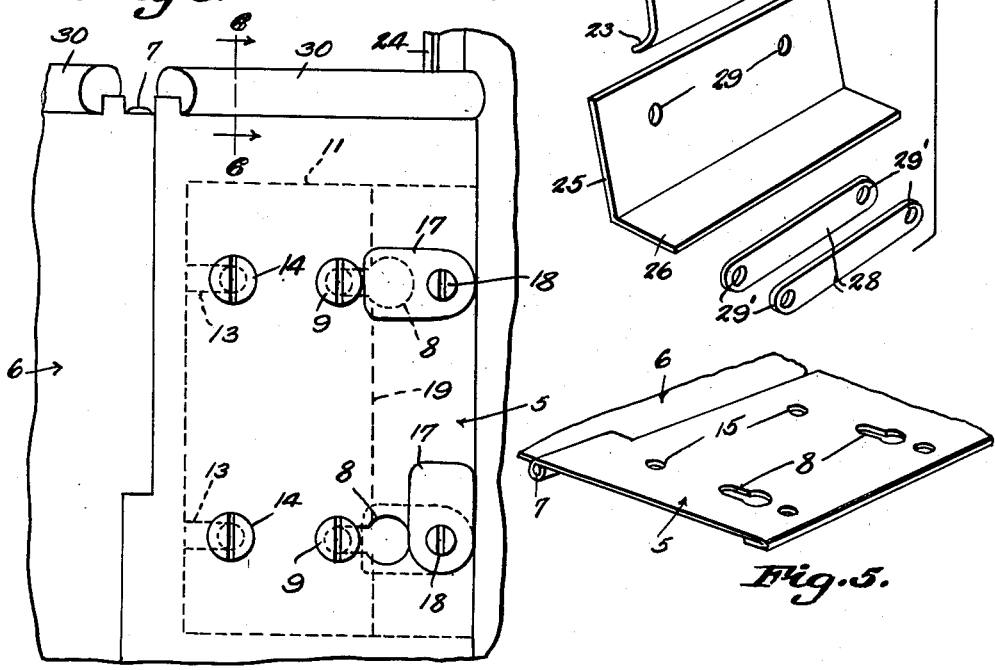
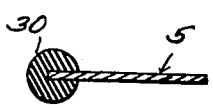
W. L. Griffin
INVENTOR.
BY C. A. Snow & Co.
ATTORNEYS.

Patented Jan. 13, 1953

2,625,358

UNITED STATES PATENT OFFICE 2,625,358

SUNSHADE FOR MOTOR VEHICLES

Walter L. Griffin, Fayette, Ohio

Application January 30, 1951, Serial No. 208,613

1 Claim. (Cl. 248—226)

This invention relates to sunshades for use on motor vehicles, the primary object of the invention being to provide a sunshade that may be readily and easily mounted on a motor vehicle, eliminating the necessity of making alterations in the usual motor vehicle structure, to mount the sunshade.

An important object of the invention is to provide a sunshade including attaching means that will securely hold the sunshade in position against vibrations when the vehicle, to which the sunshade is attached, moves over an irregular road surface.

Still another object of the invention is to provide a sunshade including a vertically swinging main section providing a shield capable of adjustment to various angular positions for shielding the occupants of the vehicle against sun rays of various conditions.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is an elevational view illustrating a sunshade constructed in accordance with the invention, as mounted above the door of a motor vehicle.

Fig. 2 is a sectional view through the sunshade and attaching plates used in attaching the sunshade to a vehicle.

Fig. 3 is a fragmental plan view of the sunshade.

Fig. 4 is an exploded view illustrating the various plates of the attaching means of the sunshade.

Fig. 5 is a fragmental perspective view of one of the sections of the sunshade.

Fig. 6 is a sectional view taken on line 6—6 of Fig. 3.

Referring to the drawing in detail, the sunshade comprises the main shade section 5 and the outer section 6, which is pivotally connected thereto by means of the pivot pin 7 which is extended through tubular portions at the adjacent ends of the sections 5 and 6, secured in place by means of a nut on one end of the pivot pin 7 which is tightened to cause frictional contact between the sections 5 and 6 so that an adjustment of the outer section may be made and held by such frictional contact.

The main shade section 5 is formed with keyhole openings 8 in which the bolts 9 are disposed, the bolts 9 being also positioned in the openings 10 of the attaching plate 11, where they are held in place by means of nuts 12.

As shown, the attaching plate 11 is provided with elongated openings 13 extending inwardly from the forward edge thereof, the openings 13 accommodating the bolts 14 which also pass through openings 15 of the main shade section 5, the bolts 14 being secured by means of the nuts 16. Pivotally mounted adjacent to the inner edge of the main shade section 5, are the pivoted guard plates 17 that are so located on the main shade section that they may move over the major portions of the keyhole openings 8, closing the openings and blocking forward movement of the main shade section 5 with respect to the bolts 9. Bolts 18 connect the guard plate 17 to the main shade section 5 in such a way that by tightening the bolts 18 the plates 17 may be held against accidental movement due to vibrations.

Disposed between the attaching plate 11 and main section 5, is the spacing plate 19 which is provided with elongated openings 20 extending inwardly from one edge thereof, and circular openings 21 formed adjacent to the opposite edge of the spacing plate, the openings 20 accommodating the bolts 9, while the openings 21 accommodate the bolts 14. This spacing plate provides means for securing the main shade section 5 to the attaching plate 11 in such a way as to provide a close fit between the attaching plate and main section and at the same time act as a means for bracing the shade at the point of attachment to the plate 11.

The attaching plate 11 has a downwardly extended curved portion 22, the longitudinal edge thereof being curved inwardly at 23 to fit within the drain trough 24 which is disposed directly above the doors of the conventional motor vehicle.

Cooperating with the downwardly curved portion 22 of the attaching plate, is the clamp plate 25 which has an inwardly extended portion 26 adapted to fit under the edge of the door frame at the top thereof, there being provided bolts 27 extended through the downwardly curved portion 22 of the plate 11, and the clamp plate 25 for drawing the downwardly curved portion 22 of the plate 11 and the clamp 25 together securely fastening the sunshade on the motor vehicle.

Due to this construction, it is obvious that the sunshade may by loosening the bolts 27, be readily and easily removed without removing the bolts in their entireties from the sunshade.

Spacing bars 28 are of lengths to extend between the openings 29 of the clamp plate 25 and are provided with openings 29 to receive the bolts 27 by means of which the spacing bars 28 are held in place, the bolts providing means to hold the downwardly curved portion 22 of the attaching plate 11 spaced from the clamp plate 25 to insure a true clamping action between the downwardly curved portion 22 and clamp plate 25 to securely hold the sunshade in place.

Along the marginal edge of each section of the sunshade, is positioned a beading 30 constructed preferably of rubber or other suitable cushioning material to guard the edges of the sunshade.

It might be further stated that the sunshade may be constructed of any sheet material such as stainless steel, plastic or the like, to meet various requirements of use.

Having thus described the invention, what is claimed is:

A sunshade comprising a body, said body having keyhole openings formed therein, an attaching plate disposed under the body, bolts extending into said keyhole openings and secured to the attaching plate, a spacing plate mounted on the attaching plate, said bolts securing the plates together and normally holding the body against movement with respect to the attaching plate, pivoted guard plates mounted on said body movable against said bolts, said bolts holding the attaching plate against movement, one longitudinal edge of the attaching plate being curved forwardly adapted to hook into the gutter of a motor vehicle, and a clamp plate bolted to the attaching plate, cooperating with the attaching plate in clamping the gutter, securing the sunshade to the vehicle.

WALTER L. GRIFFIN.

REFERENCES CITED

The following references are of record in the file of this patent:

UNITED STATES PATENTS

| Number | Name | Date |
|---|---|---|
| 1,640,088 | Megown | Aug. 23, 1927 |
| 2,117,393 | Bateson | May 17, 1938 |
| 2,199,134 | Johnson | Apr. 30, 1940 |
| 2,334,856 | Atkinson | Nov. 23, 1943 |
| 2,350,297 | Vesta | May 30, 1944 |
| 2,588,694 | Bracken | Mar. 11, 1952 |